July 13, 1965
C. CHORNA
3,194,419
TRANSPORT SYSTEM FOR SHIPPING CONTAINERS
Filed April 22, 1963
5 Sheets-Sheet 1
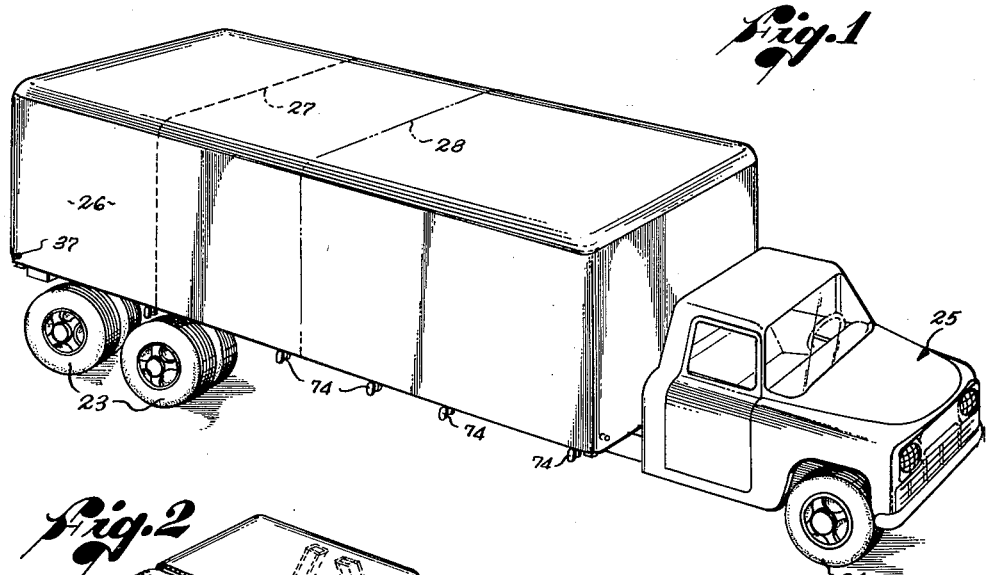
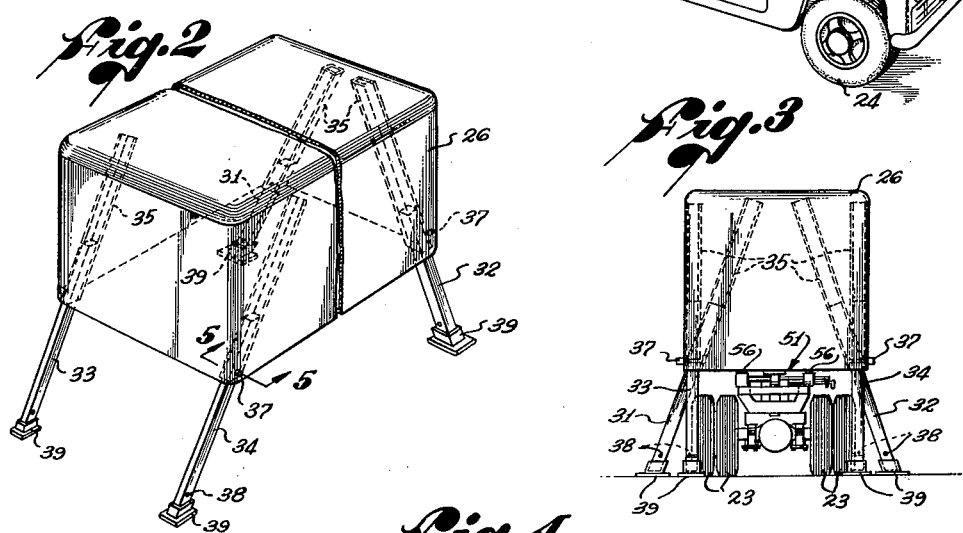
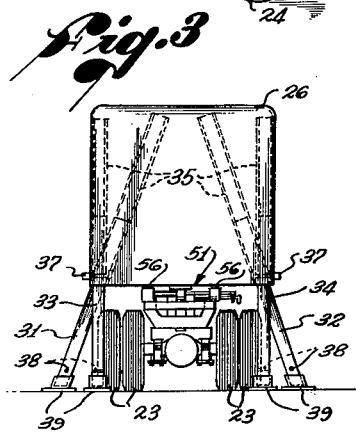
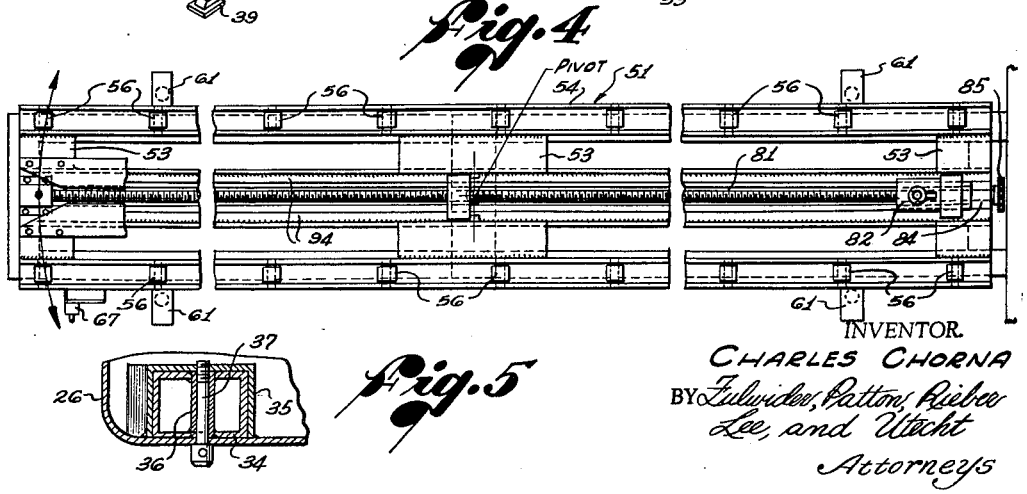
INVENTOR.
CHARLES CHORNA
BY *Zulweiter, Patton, Rieber, Lee, and Utecht*
Attorneys

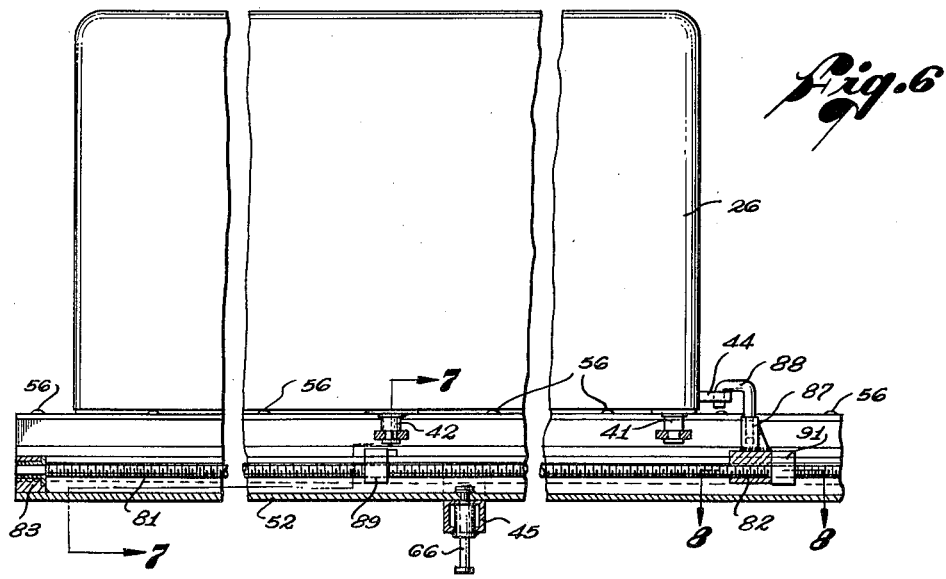

July 13, 1965 C. CHORNA 3,194,419
TRANSPORT SYSTEM FOR SHIPPING CONTAINERS
Filed April 22, 1963 5 Sheets-Sheet 3
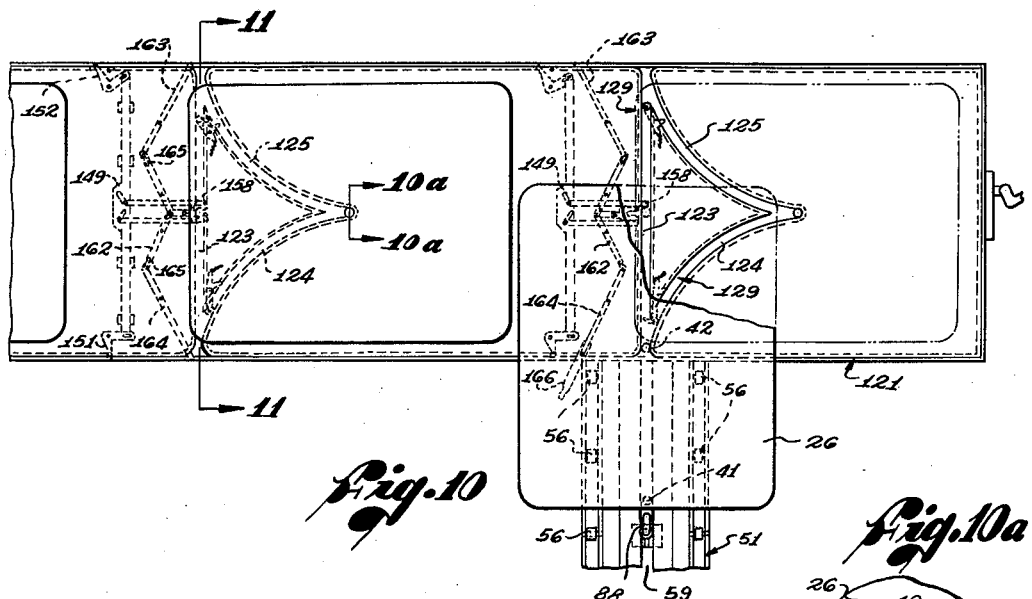
Fig. 10
Fig. 11
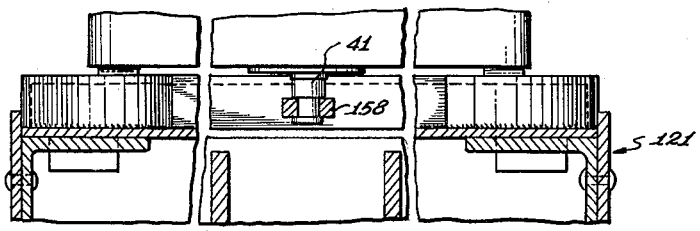
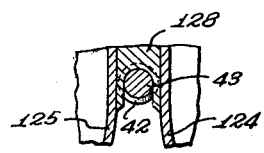
Fig. 10a
Fig. 10b
Fig. 13
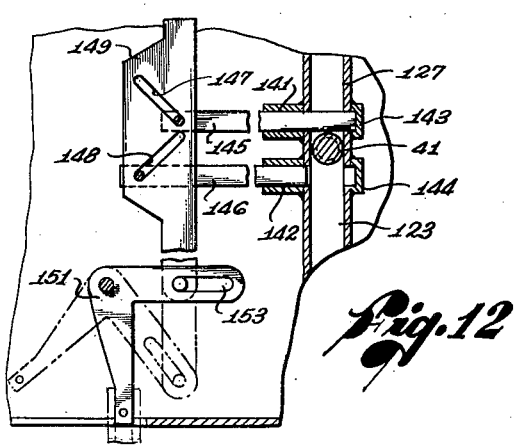
Fig. 12
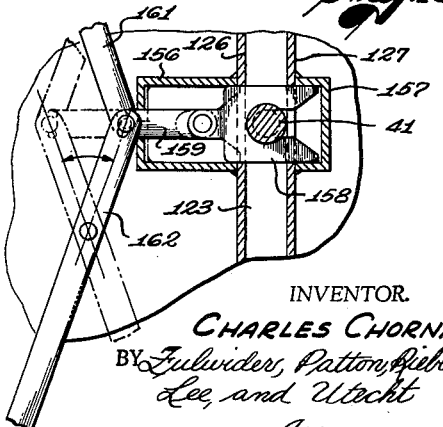
INVENTOR.
CHARLES CHORNA
BY Zulwider, Patton, Biebel,
Lee, and Utecht
Attorneys

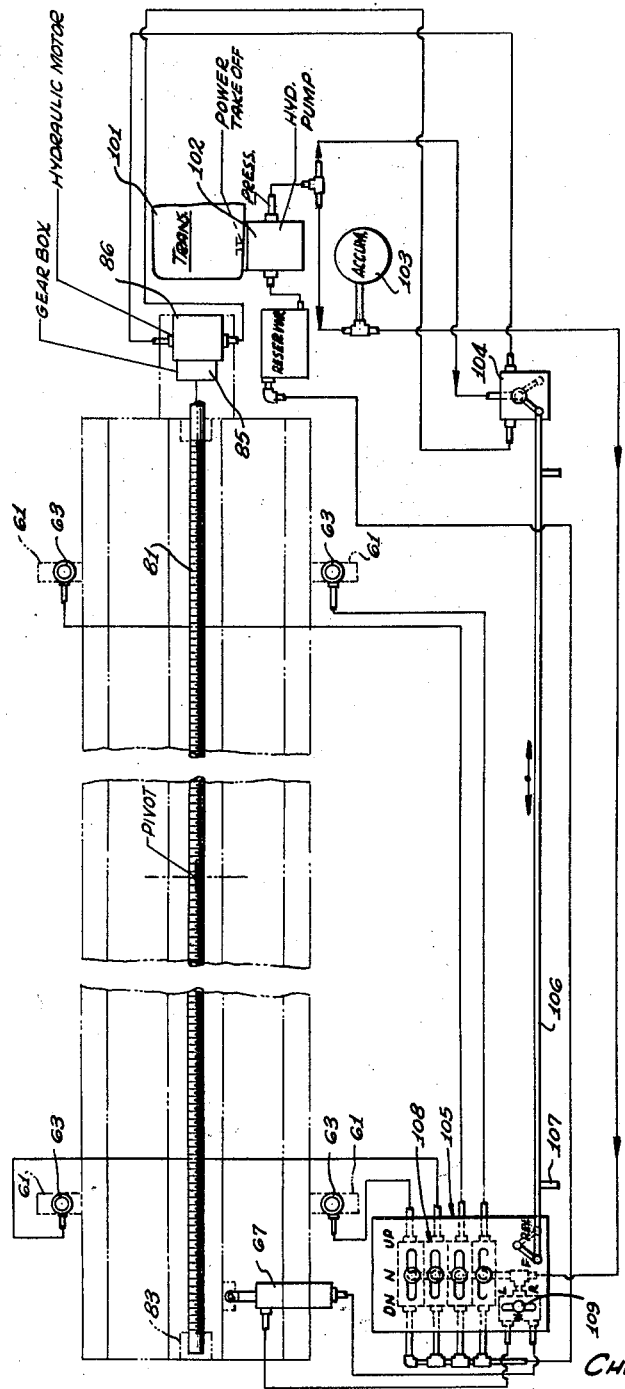

3,194,419
TRANSPORT SYSTEM FOR SHIPPING CONTAINERS
Charles Chorna, 746 S. Central Ave., Los Angeles 21, Calif.
Filed Apr. 22, 1963, Ser. No. 274,659
3 Claims. (Cl. 214—38)

The present invention relates generally to a transport system for unitized containers which may be moved by motor truck for local or short distance hauling and may readily be transferred between such motor trucks and long haul transport such as railroad cars.

Transport of materials in portable containers of less than full van and trailer size effects many economies in shipping operations. It permits the loading and unloading of the container as a unit, without requiring access to the cargo therein as in the loading and unloading of a partial load from a large van or trailer. Containers may be standardized in any desired sizes and, for illustrating the invention, units of 10 ft., 15 ft. and 20 ft. length have been selected for the illustrated embodiment. Such unitized containers may be loaded on motor trucks in multiple arrangement for local transport, but as this ordinarily affords little economy, shorter trucks accommodating single containers may be preferred as a solution for local, short distance hauling. Whether a single or a plurality of containers are mounted on the motor truck is entirely within the preference of the individual operator.

In loading the containers on and removing them from railroad cars, different procedures have been adopted in the past, but the system according to the present invention presents desirable improvements and economies over such prior container transport systems.

In railroad car loading and unloading, it is preferable that the containers be loaded from the side of the cars so that a train need not be broken to afford access to the containers. It is also preferable that any of a group of containers on a particular car be transferable to and from the car individually, without moving a succession of containers to secure access to the one desired. It is further desirable that transfer from a local haulage truck to a railroad car be effected without requiring a transfer station and equipment associated with the railway in permanent, relatively stationary relation. All of the above features are incorporated in the transport system according to the present invention.

One form of motor truck comprised in the transport system of this invention is provided with means for vertically adjusting the position of a container support thereon to correspond with the height of a railroad car with respect to which the container is to be transferred, and is further provided with means for swinging the support transversely so as to align or index its end with a particular section of the railroad car for proper transfer of the container.

Preferably a container is initially moved endwise onto the railroad car from a position transverse thereto and is then swung automatically, as an incident to its transfer movement, into a position where its longitudinal axis is aligned with the longitudinal axis of the car. Removal of the container from the railroad car to the motor truck is effected with a reverse swinging movement.

To provide for a maximum usage of the local haul motor trucks with various containers so that they will not be tied up while containers are stored or are being filled, the containers are preferably provided with legs by which they may be supported independently of the truck, as at a loading platform, with at least the front legs of the container arranged and spaced to provide clearance for the truck to pass therebetween beneath the container in assembling the truck and container.

It is an object of the present invention to provide an improved transport system for shipping containers including transfer of unitized containers between local haul vehicles and long distance transport equipment.

Another object of the present invention is the provision of an improved unit shipping container which is self-supporting and readily transferable between short and long haul transport vehicles.

Another object of this invention is the provision of an improved motor truck vehicle for transporting containers, having means facilitating the transfer of unit containers to and from long haul equipment.

A further object of this invention is the provision of improved railroad car equipment for shipping container transport providing for side loading of unit containers without breaking the train in which the car is attached and without disturbing other containers on the car.

A still further object of this invention is in the provision of an improved motor truck for transporting shipping containers including container supporting means which is adjustable vertically, is swingable to effect transverse indexing of its end, and which includes power means for moving a container on and off the supporting means.

Yet another object of the present invention is an improved system for transporting unit shipping containers on carriers including a motor truck for local haulage which may be indexed with the side of a railroad car to effect endwise transfer of a unit container between the truck and car, in which the truck and car are relatively adjustable vertically and transversely into proper alignment, and in which the transfer of the container between carriers is accompanied by swinging movement thereof to align its longitudinal axis with the longitudinal axis of the carrier to which it is transferred.

These and other objects and features of the invention will be readily apparent to those skilled in the art from the following specification and the appended drawings, in which:

FIGURE 1 is a perspective view of a motor truck forming a part of the transport system according to the present invention, with a unit container thereon;

FIGURE 2 is a perspective view of a unit container self-supported without a carrying vehicle;

FIGURE 3 is an end elevational view illustrating the arrangement of the container-supporting legs and the insertion of a motor truck vehicle thereunder;

FIGURE 4 is a top plan view of the adjustable bed of the motor truck according to the present invention;

FIGURE 5 is a detailed sectional view on the line 5—5 of FIGURE 2, showing the mounting of a supporting leg for the container;

FIGURE 6 is a partial, longitudinal, vertical sectional view through the truck bed, with a container supported thereon and with parts shown in elevation;

FIGURE 7 is a transverse sectional view on the line 7—7 of FIGURE 6;

FIGURE 7a is an enlarged, detailed sectional view on the line 7a—7a of FIGURE 7;

FIGURE 8 is an enlarged, detailed sectional view on the line 8—8 of FIGURE 6;

FIGURE 9 is a detailed sectional view on the line 9—9 of FIGURE 7, showing a locking mechanism for the container, FIGURE 10 is a top plan view of a portion of a railroad car according to the present invention, with containers loaded thereon and a container in process of transfer with respect thereto;

FIGURE 10a is an enlarged, detailed sectional view on the line 10a—10a of FIGURE 10;

FIGURE 10b is a detailed sectional view on the line 10b—10b of FIGURE 10a;

FIGURE 11 is an enlarged, broken, transverse sectional view on the line 11—11 of FIGURE 10;

FIGURE 12 is an enlarged, partial, sectional view of limiting mechanism for a railroad car mounted container;

FIGURE 13 is an enlarged detailed view of locking mechanism for a railroad car mounted container;

FIGURE 18 is a schematic representation of the hydraulic system for manipulating the elements of the motor truck bed to effect transfer of a container relative thereto.

Figure 14:
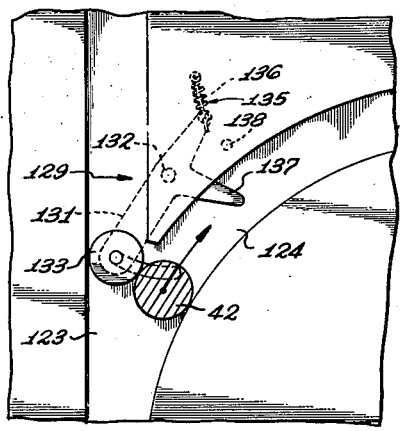
FIGURES 14 and 15 are two positional views for switching means determining trackways in the railroad car followed by container guiding pins.

The unit containers and the motor truck component of the transport system according to the present invention are illustrated more particularly in FIGURES 1 through 9 and 18. The motor truck component, indicated generally at 21 in FIGURE 1, includes a main frame 22 mounted on multiple rear wheels 23 and steerable front wheels 24, and is propelled in conventional manner by any desired type of motor or engine mounted within the front cab 25. In FIGURE 1, the truck is shown of a length to accommodate the longest container 26, shown in full lines and, in the example previously given, of a length of 20 feet. The dashed line 27 indicates the rearward extent of the intermediate unit container of 15 feet length, and the interrupted line 28 indicates the rearward extent of the shortest unit container of 10 feet. The containers may have any desired dimensions in cross section, convenient dimensions being approximately 8 feet in width and 8 feet or more in height. It will be readily understood that the truck 21 may be limited in length to conform to the lengths of the shorter unit containers, for which it may have individual use, or the long truck 21 shown in FIGURE 1 may be used with the shorter unit containers individually or may support a plurality of unit containers thereon.

Referring now to FIGURES 2, 3 and 5, a unit container 26 is shown with its legs extended for self-supporting of the container. The unit containers may be of any desired construction and may open in any preferred manner—for example, by end or side doors or by a removable top. The details of the container construction have not been incorporated in the drawings as they form no part of the present invention, which contemplates the use of unit containers of any desired conformation and purpose within the system. For self-support, the unit containers are provided with a pair of front legs 31, 32 and a pair of rear legs 33, 34. The legs 31–34 may be of hollow tubular construction, as shown in the sectional FIGURE 5, and telescopically received within complementary enclosures 35 mounted on the inside surfaces of the walls of container 26. The enclosures 35 for the rear legs 34 are preferably mounted on the side walls of the container and incline forwardly and rearwardly, so that extended legs 33, 34 incline rearwardly, as shown more particularly in FIGURE 2. The enclosures 35 for the legs 31, 32 are preferably mounted on the inside surface of the front wall of the container 26 and incline toward the opposite sides of the container, so that extended legs 31, 32 incline outwardly, as shown in FIGURES 2 and 3. The inclination of the legs 33 and 34 adds to the stability of the container, particularly when a truck frame is being inserted thereunder, and the legs 31 and 32 are spaced far enough apart so that they provide clearance for the wheels of the truck as the truck is inserted under the container, as shown more particularly in FIGURE 3.

The container legs 31–34 are provided with transverse tubular sleeves 36 adjacent their upper ends which receive retaining pins 37 when the sleeves 36 are aligned with complementary openings in the container walls and the walls of the enclosures 35, so that the legs are held in their extended position by the pins 37. The legs 31–34 may be provided with similar retaining sleeves 38 adjacent their lower ends, through which the pins 37 extend to hold the legs in their retracted position within the interior of the container 26. Removable feet 39 may be received upon the ends of the legs 31–34 to increase the supporting area in contact with the parking surface.

Container 26 has a pair of guiding and holding pins 41 and 42 mounted on the bottom and along the longitudinal axis thereof, the pin 41 being located adjacent to the forward end of the container, and the pin 42 adjacent the center of the container. Each of the pins 41 and 42 has a portion 43 of reduced diameter adjacent its free end. An eye or similar attachment means 44 projects from the forward wall of the container 26 adjacent the bottom and centrally thereof.

Referring now more particularly to FIGURES 4, and 6 through 9, the main frame 22 of the motor truck 21 extends longitudinally thereof and has depending therefrom at spaced points along its length transverse saddle members 45 which serve both to rigidify and support the frame. Upon the transverse saddles 45 and the main frame 22 is supported a vertically adjustable and transversely shiftable container-supporting truck bed, indicated generally by the numeral 51. Above the saddles 45 and interiorly of the main frame 22 is mounted an elongated support 52, substantially U-shaped in cross section and having horizontal flanges 53 extending outwardly from the free ends of its legs adjacent its opposite ends and the central portion. Upon the flanges 53 are rigidly mounted a pair of parallel, longitudinally-extending supporting members 54 and 55 which are substantially U-shaped in cross section and which have container-supporting rollers 56 rotatably mounted in their upper portions to extend thereabove. A pair of guiding angles 57, 58 are bolted or otherwise secured to the upper edges of the supporting member 52 and form a longitudinally extending slot 59 therebetween, in which are guided the pins 41 and 42 on the container 26.

Elevating brackets 61 are rigidly secured to and extend outwardly from the members 54, 55 adjacent the opposite ends thereof. These elevating brackets 61 have horizontal under surfaces slidably engaged by heads 62 of the pistons of hydraulic jacks 63 whose cylinders are rigidly mounted on the truck main frame 22. An elongated pivot pin 66 interconnects the bight of the U-shaped supporting member 52 and the central saddle 45 to provide a vertical pivot about which the U-shaped member 52 may rotate to move its opposite ends transversely of the main frame 22. The elevational and rotational movements are participated in by the supporting members 54, 55 and the slot providing guides 57, 58, all of which are rigidly secured to the supporting member 52. A hydraulic cylinder 67 is mounted on the main frame 22 adjacent the back thereof and has its piston rod 68 pivotally connected to an elongated pin 69 rigidly secured to the member 52. The lengths of the pivot pin 66 and the shifting attachment pin 69 provide for vertical movement of the adjustable truck bed relative to the main frame and supporting saddles.

At predetermined locations, dictated by the positions of the pins 41 and 42 on the containers 26, the supporting member 52, the guide angles 57, 58 and the supporting member 55 are provided with horizontally aligned slots in which are slidably mounted latching bars 71. The latching bars 71 have slots 72 in their ends in which are received the reduced diameter portions 43 to latch the pins 41, 42 and thereby the container 26 to the truck bed against movement both vertically and longitudinally thereof. The latching pins 71 have rod-like extensions 73 at the outer ends thereof to which are secured operating handles 74. The handles 74 may be held against involuntary movement by locking or sealing wires 75 connected to stationary brackets 76 mounted on the member 55. Where the truck 21 is to accommodate a number of different sized unit containers, as in FIGURE 1, the latching bars 71 will be distributed longitudinally of the truck in positions to engage the pins 42 on the different sized containers.

The truck component of the transport system of this invention preferably includes means for moving the containers longitudinally of the truck bed and for transferring them to and from the long haul carriers. The moving and transferring means may take many forms—such as an endless cable, a hydraulic ram, or other operating arrangement—but is conveniently illustrated as comprising an elongated screw 81 having a traveling nut operator 82 mounted thereon and movable thereby longitudinally of the truck bed. The elongated screw 81 is mounted within the U-shaped member 52 and is supported at its opposite ends in bearings 83 and 84. It is connected through a gear box 85 to a rotating hydraulic motor 86 (FIGURE 18). A socket 87 is rigidly secured to the top of the traveling nut 82 and is disposed to travel within the slot 59. A link 88, interchangeable with links or draw bars of different lengths, interconnects the socket 87 with the eye 44 on the container 26, so that the container will move with the traveling nut 82.

In view of the length of the screw 81, it is desired to support it intermediate its ends while permitting the traveling nut 82 to travel throughout the entire length of the screw. For this purpose, there are provided a pair of traveling supports 89 and 91 which have bearing sleeves extending therethrough through which the screw 81 is freely slidable. The traveling supports 89 and 91 are notched at their opposite sides at 93 to receive guide rails 94 rigidly secured to the interior surfaces of the U-shaped member 52, in opposed relation. Substantially intermediate the ends of the screw 81, stops 95 are supported on the interior surfaces of the member 52 in position to stop the traveling supports 89 and 91 and prevent their movement therepast. The traveling supports 89 and 91 may be of non-magnetic material and have disposed in their opposed faces permanent magnets 96 and 97, respectively. The stops 95 and the traveling nut 82 are either of magnetic material or have magnetic portions attached thereto for cooperation with the magnets 96 and 97. The parts are shown in FIGURE 8 in the position they assume when the traveling nut 82 is picking up a traveling support at one side of the stops 95 and is soon to leave a traveling support at the opposite side thereof. Therefore, regardless of the position of the traveling nut 82, one or the other of the traveling supports 89, 91 will be in position to support the mid portion of the operating screw 81.

Assuming in FIGURE 8 that the nut 82 is traveling toward the left, the mid portion of the operating screw 81 has heretofore been supported by the traveling support 89 which has been held against the stops 95 by its magnet 96. The traveling nut 82 is shown in FIGURE 8 just after it has engaged and moved the traveling support 89 away from the stops 95 and, as it moves further to the left, it will continue to move the traveling support 89 along the screw 81. At the same time, it is pulling the traveling support 91 along with itself, since they are interconnected by the attraction of the magnet 97 and the magnetic material of the nut. As the traveling nut 82 continues to move to the left, the traveling support 91 will engage the stops 95, will thereby be disconnected from the traveling nut, and will be magnetically held against the stops 95 in position to provide a middle support for the operating screw 81. When the traveling nut moves in the reverse direction—that is, to the right as viewed in FIGURE 8—it will perform the reverse operation: pull the traveling support 89 back into engagement with the stops 95 and move the traveling support 91 away from the stops and carry it toward the forward end of the operating screw. It is therefore seen that the middle of the operating screw 81 is provided with support at all times, regardless of the position of the traveling nut 82.

Referring to FIGURE 18, there is shown a hydraulic system for effecting the various adjusting and transferring movements of the elements of the truck bed. It will be understood that conventional electrical and mechanical systems can be substituted for the hydraulic system which is illustrated by way of example only. The transmission of the propelling engine or motor for the truck 21 is illustrated diagrammatically at 101 driving a hydraulic pump 102 through a power take-off. The hydraulic pump 102 is connected to an accumulator 103, a control valve 104 and a control panel 105. Control valve 104 controls the rotation of the hydraulic motor 86 and may be operated at the control panel 105 by an elongated connecting rod 106 actuated by a handle 107. The hydraulic lines connecting to the motor 86 include flexible hose or tubing to permit movement of the motor with the truck bed. Hydraulic fluid to the lifting jacks 63 is controlled by ganged valves 108 which operate in unison to effect upward and downward movement of the jacks to secure the desired elevation of the truck bed by the engagement of the heads 62 of the hydraulic jacks with the lifting brackets 61 extending from the members 54 and 55. Hydraulic fluid to the shifting cylinder 67, which effects transverse movement of the end of the truck bed in opposite directions, is controlled by a valve 109.

The operation of the truck bed to index the container supports and guide slot, vertically and horizontally, will be apparent from the previous description of the parts. Operation of the ganged valves 108 controls the supply of hydraulic fluid to the hydraulic jacks 63 and controls the elevation of the truck bed 51 above the main frame 22, and return of the bed to its bottom position resting on the frame. The supply of hydraulic fluid to the shifting hydraulic cylinder 67 controls the pivoting or transverse movement of the end of the truck bed to properly index the guide slot 59, this latter control being effected through the valve 109. Transference of a container between long and short haul carriers is effected by controlling the rotation of the elongated screw 81 through manipulation of the valve 104 by the actuating handle 107 to control the direction of rotation of the hydraulic motor 86. The transfer operation of the operating screw 81 and traveling nut 82 will be described more in detail hereinafter.

Figure 16:
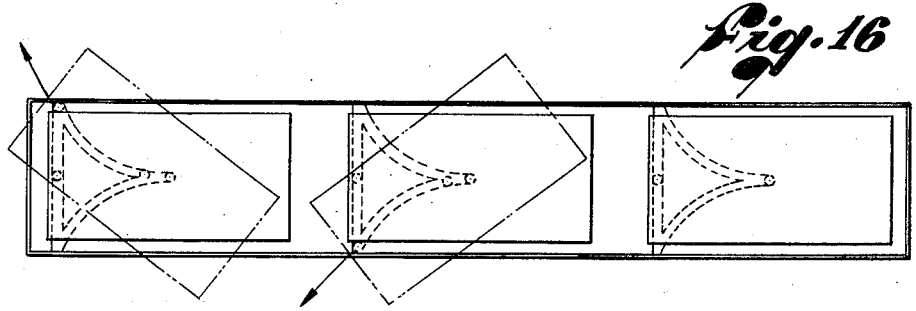
FIGURES 16 and 17 are schematic representations of the mounting of larger containers on railroad cars, but following in general the structure of the arrangement of FIGURE 10 for smaller containers.
Figure 17:
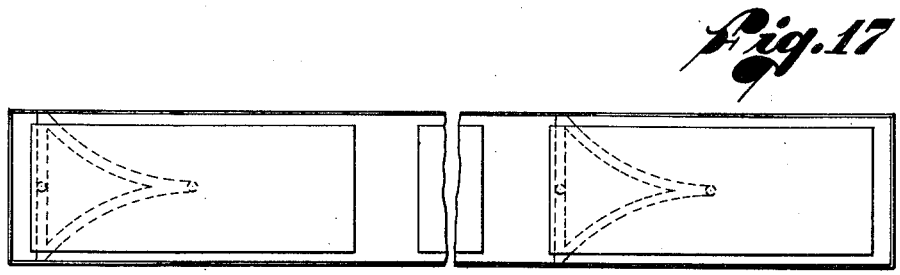

Referring now to FIGURES 10 through 15 of the drawing, there is illustrated therein one form of long haul carrier usable in the transport system according to the present invention. This carrier is shown as a flat top railway car 121 having provision for carrying a plurality of unit containers thereon. As shown in FIGURE 10, the car 121 is designed for carrying a plurality of containers 26 of the smallest or 10 ft. size, although the car is readily adaptable for containers of larger sizes, as shown in FIGURES 16 and 17, or for containers of varied sizes. As shown in FIGURE 10, a truck bed 51 has been brought up to the side of the car 121 with the longitudinal axis of the truck bed at substantially right angles to the longitudinal axis of the railway car and with the container 26 substantially in a position intermediate the two carriers—that is, substantially half on each of the long haul and short haul carriers.

The railway car 121 preferably has a double walled top comprising a bottom plate 120 and a top plate 122, with the container 26 supported on the top plate 122. Guide slots are provided in the top plate 122 and comprise a straight transverse slot 123 and a pair of curved slots 124 and 125 leading from the central axis to the opposite sides of the car at the ends of the transverse slot 123. The slots 123–125 are shown as defined by spaced vertical walls 126 and 127. Several identical groups of slots are provided along the length of the car 121 to provide stations accommodating a plurality of unit containers along the car.

The slots 123–125 are designed to receive and guide the pins 41 and 42 on the bottom of the containers 26, the pin 42 being received in one or the other of the slots 124, 125 depending on from which side of the railway car the container transfer is made, and the pin 41 being received within the transverse slot 123. At the junction of the slots 124 and 125 there is provided a stationary holding element 128 disposed between the walls 126 and 127 and positioned to embrace the reduced diameter portion 43 of the pin 42, as shown in FIGURES 10a and 10b, to lock the pin 42 when the container 26 is in its fully mounted position on the railway car.

Figure 15:
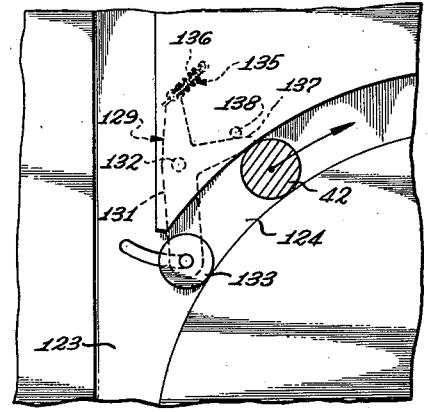

At the junctions of the slots 123 and 124, and 123 and 125 are provided switching devices 129, shown in enlarged detail in FIGURES 14 and 15. In FIGURE 14, the switching device 129 is shown in the position it assumes prior to the transfer of a container 26 onto the railway car. The switch is made up of an elongated arm 131 pivoted intermediate its ends at 132 and carrying an obstructing roller 133 at one end. The roller end of the lever 131 is guided in an arcuate slot 134 in the bottom plate 120. The opposite end of the lever 131 is connected to a compression spring and guide 135 which is pivoted at 136 and which forms, with the lever 131, an over center device which is bistable in the two positions of FIGURES 14 and 15. The lever 131 has an arm 137 extending therefrom opposite the pivot 132.

With the switch 129 in the position of FIGURE 14, the roller 133 blocks the slot 123 and forces the container pin 42 to pass into the slot 124. As the container pin continues along the slot 124, it engages the arm 137 to rotate the lever 131 through dead center position, whereupon it snaps into the position of FIGURE 15 with the arm 137 engaging a stop 138. The roller 133 now bars the slot 124 but opens the slot 123 so that the following container pin 41 is free to move transversely of the railway car in the slot 123 but is prevented from entering the slot 124. When a container is removed from a railway car, the container pin 41 moves out of the slot 123 into the local carrier guide slot 59, and the container pin 42 engages the roller 133 to move the lever 131 through its dead center position, whereupon it snaps back into the position of FIGURE 14 to be ready for the transfer of a new container onto the car.

Referring more particularly to FIGURES 10 and 12, there is shown therein limiting means for determining the ultimate position of the container pin 41 when a container is transferred onto the railway car. The wall 126 of guide slot 123 is provided with a pair of guide sleeves 141, 142 disposed on opposite sides of the longitudinal axis of the railway car. The wall 127 of guide slot 123 is provided with a pair of sockets 143 and 144 aligned with the guide sleeves 141, 142, respectively. Limiting bars 145 and 146 are slidable in the sleeves 141 and 142, and receivable in sockets 143 and 144, respectively, to limit movement of the container pin 41 in opposite directions. The limit bars 145 and 146 are alternately projectable across the guide slot 123, having transverse pins at their ends slidably disposed in slots 147 and 148 in a transverse bar 149. The bar 149 is guided for rectilinear movement only, transversely of the railway car, and is connected at its opposite ends by pin and slot connections to bell crank operators 151 and 152 at the opposite sides of the railway car. The limiting bars 145 and 146 may thus be operated from either side of the car by rotation of the appropriate operator 151, 152.

Mechanism is provided for locking the pin 41 in its position at the axis of the railway car as limited by one of the bars 145, 146. For this purpose, the walls 126 and 127 are provided at the center line of the car with guide sockets 156 and 157 within which is reciprocably mounted a bifurcated locking element 158 in whose slot is received the reduced diameter portion 43 of the pin 41, as shown in FIGURE 13. The locking element 158 is connected by a link 159 to a pair of pivoted levers 161 and 162 extending toward the opposite sides of the car, and which are in turn connected by pin and slot connections 165 to a pair of pivoted levers 163 and 164, respectively. The ends of levers 163 and 164 extend adjacent to the opposite sides of the railway car where they may be engaged by suitable handle extensions, such as shown at 166 in FIGURE 10.

FIGURES 16 and 17 diagrammatically illustrate the guide slot arrangements, similar to the guide slots 123, 124 and 125, which are designed to accommodate containers of 15 ft. length in FIGURE 16 and 20 ft. length in FIGURE 17. Since the pins 41 and 42 are spaced apart a greater distance in these larger length containers, the guide slots 124 and 125 must be modified to conform. The other parts of the railway cars of FIGURES 16 and 17 will conform to those illustrated for the smaller sized containers in FIGURES 10 through 15.

In operating the transport system according to the present invention, it is apparent that no stationary equipment is required to be associated with the long haul carrier, and that no auxiliary supporting equipment is associated with the short haul carrier of the nature of separable dollies, bogies, or other equipment, and that in each case the long haul and short haul carriers are self-contained and together embody all the equipment necessary for the short and long haul of unit containers and the transfer of the containers between the carriers.

In describing the operation of the transport system of the present invention, it will be assumed that a loaded unit container 26 is self-supported on its extended legs 31–34, as in FIGURES 2 and 3. A short haul motor truck, such as 21, with its bed 51 lowered, is moved into position by backing its rear wheels 23 between the spread-apart front legs 31, 32 on the container. When the truck has been backed into proper position beneath the container, the bed 51 can be raised by moving the ganged valves 108 to apply hydraulic fluid to the lifting jacks 63. The heads 62 of the lifting jacks then engage the lifting brackets 61 on the truck bed 51 to elevate it. In this upward movement, the container pins 41 and 42 should be received within the slot 59, but if they are not properly aligned therewith, the truck bed 51 can be rotated into alignment by means of the hydraulic shift cylinder 67 under control of the valve 109. With the pins 41 and 42 properly within the slot 59, the truck bed 51 is then elevated sufficiently to raise the weight of the container 26 off of its legs 31–34. The pins 37 may then be removed from the legs and the legs inserted inwardly of the container in their guide enclosure 35 and the pins 37 reinserted in the lower holes 38 to hold the legs 31–34 in their retracted positions within the container. As the legs are raised, the feet 39 may be removed and stored on the truck or in the loading station.

As the container 26 will probably not be properly aligned with respect to the locking bar 71, the traveling nut 82 may now be moved toward the front end of the container by manipulation of the valve 104 to rotate the operating screw 81. When the traveling nut 82 and the socket 87 thereon are properly positioned, the link 88 may be inserted in the socket 87 and the eye 44 on the container and by reversing the rotation of the screw 81 and the travel of the nut 82, the container may be drawn into its fully indexed position with respect to the truck, whereupon the locking bars 71 (which had been retracted prior to the raising of the truck bed) may now be moved inwardly into locking position, with the slots 72 in the ends thereof engaging the reduced diameter portions 43 on the pins 41 and 42 on the bottom of the container. The valve 109 may now be manipulated, if necessary to align to longitudinal axes of the container and truck, and the ganged valves 108 will be operated to move the truck bed down into its normal position supported on the main frame of the truck with the load removed from the hydraulic jacks 63. The motor truck is now propelled in normal manner to the site of the long haul carrier, which may be a railway car or a floating or other carrier to which the unit container is to be transferred.

Assuming the case of a railway car for the long haul carrier, the short haul truck will be backed against the side of the railway car with its longitudinal axis at right angles thereto, as shown in FIGURE 10. It will be seen that this may be carried out with respect to any location for a container on the railway car without regard to the presence or absence of other containers on the car, as the locations provided by the slots 123 are so spaced that the transfer of one container is not interfered with by the presence of containers in positions adjacent thereto. The truck is preferably backed into the side of the railway car so that the slot 59 in the truck bed is aligned with a selected slot 123 in the railway car. The truck body 51 is now elevated by manipulating the ganged valves 108 to supply hydraulic fluid to the lifting jacks 63 so that the container bottom is at the same level or a little above the top plate 122 on the railway car on which the container bottom is to rest. Any misalignment of the slots 59 and 123 can now be taken care of by manipulating the valve 109 to shift the end of the truck bed so that the ends of the slots are indexed and the container pins will move freely from the truck bed slot 59 into the slot 123 in the railway car. The handles 74 are now pulled outwardly, after breaking their retaining wires 75, and the latching bars 71 are thereby pulled outwardly in their slots to release the pins 41 and 42 on the container. The containers 26 are therefore free to move toward the rear of the truck while supported on the rollers 56 on the truck bed.

The valve 104 is now manipulated to effect rotation of the hydraulic motor 86 and of the elongated operating screw 81 therewith in the direction to move the traveling nut 82 toward the back of the truck. The container 26 moves rearwardly with the nut 82 from the engagement of the link 88 in the socket 87 on the traveling nut and the eye 44 at the front of the container. The container thereby moves off the truck bed from the rollers 56 onto the top plate 122 on the railway car which it will normally slidably engage after its center of mass passes the end of the truck. The container 26 is shown in FIGURE 10 at the point where its central pin 42 has just entered the slot 123 in the railway car. As the traveling nut 82 continues to move toward the back of the truck, the container pin 42 is prevented from continuing into the slot 123 by the blocking switching roller 133, which is in the position of FIGURE 14, and the pin 41 is guided into the slot 124. The pin 42 then engages the arm 137 to snap the switching roller 133 into the position of FIGURE 15, as previously described, thereby opening the slot 123 for passage of the following pin 41 therein. This container movement continues until the traveling nut 82 reaches the end of its rearward travel and is positioned at the back of the truck. At this time, the pin 41 on the container is just about ready to enter the slot 123 on the railway car. If the limiting bolt 145 is not now extended, the lever 151 will be manipulated to move the limiting bolt 145 into its projected position, as shown in FIGURE 12, so as to limit the position of the pin 41 at the axis of the railway car.

The flow of hydraulic fluid to the motor 86 is now stopped to relieve the pressure on the link 88, which is removed. The supply of hydraulic fluid to the motor 86 is reversed, so that it and the screw 81 rotate in reverse direction to retract the traveling nut forwardly. This movement is continued until the traveling nut 82 has moved forwardly a distance greater than half the length of the container, whereupon the traveling nut is stopped and a long reach or draw bar link inserted in the socket 87 and the eye 44 so that the traveling nut 82 will drive the container while remote therefrom. Fluid is again supplied to the motor 86 to rotate the screw 81 to move the traveling nut 82 toward the back of the truck and, through the long reach link, the container is moved completely onto the railway car, the pin 42 continuing in the slot 124 until it is locked by engagement with the slot in the stationary locking member 128, and at the same time, the pin 41 moving across the slot 123 until it engages the limiting bar 145. The handle 166 is manipulated to move the locking element 158 to engage the pin 41 and the container 26 is securely mounted and locked on the railway flat car.

The supply of hydraulic fluid to the motor 86 is again interrupted to permit removal of the long reach or draw bar link and the fluid may be again supplied in the reverse direction to move the traveling nut 82 to its forward position at the front of the truck bed, or the nut may be left in its back position. In the movements of the traveling nut 82 past the mid point on the screw 81, it will alternatively pick up and leave the traveling supports 89 and 91, as previously described in the detailed description of FIGURE 8, so that the center portion of the elongated screw 81 will always be supported.

The valve 109 may be manipulated to realign the longitudinal axes of the truck bed and main frame, if they had been placed out of alignment, and the ganged valves 108 operated to lower the truck bed back onto the main frame. The truck 21 may now be driven back to a loading point to secure a new unit container for transport to the long haul carrier.

Alternatively, the truck 21 may be used to remove a unit container from the train for local delivery where a container having a local address has been shipped in. If the truck returns to a loading point, it will pick up another container, as originally described in setting forth the operation of the transport system of this invention. If the truck is to remove a container from the train, it will operate just in reverse of the description for the loading of a container from the truck onto the railway car.

To remove a unit container from a long haul railway car to a short haul motor truck in the transport system of this invention, the motor truck is again backed up to the side of the railway car, substantially as shown in FIGURE 10, with its longitudinal axis at right angles to the longitudinal axis of the car. The slot 59 in the truck bed is aligned with the slot 123 in which is disposed the pin 41 of the unit container to be transferred. The height of the truck bed is not as material in the transfer from the railway car to the truck, but approximate concurrence in carrier heights may be attained, as before, by manipulation of the ganged valves 108 to control the supply of hydraulic fluid to lifting jacks 63. Indexing of the ends of the slots 59 and 123 may then be accomplished, as before, by manipulation of the valve 109 to control the hydraulic fluid to the shifting cylinders 67. The valve 104 is then opened in a direction to rotate the hydraulic motor 86 and elongated operating screw 81 to move the traveling nut 82 to the extreme rear of the truck. In this position, a long draw bar link is connected in the socket 87 on the traveling nut and in the eye 44 on the container.

Prior to moving the container, the lever 164 is moved by the handle extension 166 to move the locking member 158 out of engagement with the pin 141, which then becomes free to move toward the side of the railway car opposite whichever limiting bar is projected, as illustrated, the bar 145. The latching bars 71 on the truck are also moved to unlatching positions to free the slot 59 on the truck bed 51 for movement of the container pins therein.

With all latching members released, the valve 104 is then moved to cause rotation of the screw 81 to move the traveling nut forwardly on the truck bed. With the draw bar connection, this pulls the container onto the truck bed with a turning movement, since the pin 41 rides in the straight transverse slot 123, while the central container pin 42 follows in the inclined slot 124. When the traveling nut 82 is in its extreme forward position, the container will be substantially in the position shown in FIGURE 10—that is, at the half-way mark of its transfer from the railway car to the motor truck.

The feed of hydraulic fluid to the motor 86 is now cut off, and the long draw bar removed. The hydraulic fluid is then fed through the valve 104 in a direction to rotate the screw 81 to move the traveling nut 82 back toward the rear of the truck bed. When the traveling nut reaches the position of FIGURE 10, it is stopped again by closing the valve 104, and the short link 88 is inserted in the socket 87 and the eye 44, and the valve 104 again manipulated to rotate the screw 81 to move the traveling nut 82 and the container 26 therewith forwardly into its fully mounted position on the truck bed. When in this position, the valve 104 is closed, the locking bars 71 are moved inwardly to engage the pins 41 and 42, and the container is locked in position on the truck bed. The handles 74 on the locking bars 71 may then be wired or otherwise connected to the brackets 76 to prevent involuntary unlatching of the container pins.

If the axes of the truck bed and main frame are not aligned, the valve 109 may be manipulated to shift the truck bed into alignment with the main frame axis, and the ganged valves 108 are operated to lower the hydraulic jacks 63 to place the truck bed in direct supported relation with the main truck frame. Thereupon, the truck may be self-propelled to convey the unit container to its local delivery point.

When the container was mounted on the railway car, the switching device 129 was in the position in FIGURE 15, and as the container is transferred to the motor truck, the central container pin 42 engages the blocking roller 133 and moves the switching device over center, so that it snaps into the position of FIGURE 14, with the roller 133 blocking the slot 123 in readiness for receiving a new container to be transferred to the railway car from the motor truck.

Since duplicate equipment is placed at the opposite sides of the railway car, it is apparent that containers may be transferred to and removed from the railway car from either side thereof, and that a container transferred to the car from one side may be removed from the other side, as desired, with proper manipulation of the limiting bars 145 and 146.

Where, in the transport system of this invention, the local haul motor truck is to transfer unit containers to long haul carriers, such as ships, where hoist equipment is available, it is apparent that the local haul truck may be driven into a position where the hoist will engage a container thereon. Upon release of the latching bars 71, as previously described, the unit container may be lifted directly upwardly off the truck bed and conveyed to its storage point on the carrier vessel, since the pins 41, 42 will freely leave the guide slot 59 in the truck bed. It will be understood that for such vessel carrier operation the unit containers may be supplied with conventional attachment equipment of any desired form.

A unit container is removed from the short haul truck for delivery, storage, loading and unloading in any desired manner, and may be readily returned to its self-supported position of FIGURES 2 and 3. In this operation, the truck moves to the container parking position and the truck bed is elevated by supplying hydraulic fluid to the lifting jacks 63. Thereafter, the pins 37 are removed and the legs 31–34 dropped down, with the feet 39 being slipped on the ends of the legs, if desired. The pins 37 are returned into locking positions in the sleeves 36 adjacent the upper ends of the legs, and the truck bed 51 is lowered by lowering the hydraulic jacks 63, so that the container will be supported upon its legs 31–34. The truck may then be driven forwardly out from under the container, the truck wheels clearing the outwardly inclined legs 31, 32 as shown in FIGURE 3.

While certain preferred embodiments of the invention have been specifically illustrated and described, it will be understood that the invention is not limited thereto, as many variations will be apparent to those skilled in the art, and the invention is to be given its broadest interpretation within the terms of the following claims.

I claim:

1. A long haul carrier for a transportation system comprising: a railway car having a substantially flat top supporting surface with a plurality of container unit supporting stations spaced longitudinally therealong, each of said container unit stations comprising a transverse straight guide slot and a second guide slot divergent away from the straight slot for receiving spaced guide pins depending from a container unit; switching means at the junction of said straight and divergent guide slots, movement of a first container unit guide pin into the divergent slot causing operation of the switching means to switch the subsequent guide pin into the straight slot whereby said container units are received with their axes at substantially right angles to the axis of the railway car and are turned as an incident to their movement onto the top of the car into a mounted position where the axes of the units and the car are coincident; stationary latching means at the end of said inclined guide means for receiving and holding one of said container unit guide pins; and manually manipulatable locking means for engaging the other guide pin on the container unit when it is in its central position.

2. The long haul carrier defined in claim 1, in which the straight guide slot extends between the opposite sides of the railway car and the divergent guide slot is duplicated at the opposite sides of the car to receive the container units from either side of the car; and means manipulatable from either side of the car for stopping the container unit guide pin received in the straight guide slot at the center line of the car.

3. A transportation system for shipping container units comprising: a short haul carrier for local transport of container units; a long haul carrier for long distance transport of container units, said short haul carrier comprising a motor truck having a container unit supporting bed thereon; means on said truck for adjusting the elevation of said supporting bed to the elevation of the long haul carrier; means on said truck for shifting the end of said supporting bed transversely of the truck to index it with a station on said long haul carrier; means for guiding a container unit for movement on said supporting bed longitudinally only thereof; means on said long haul carrier for receiving a container unit with its longitudinal axis at right angles to the longitudinal axis of the carrier and for guiding and locating said container unit into a mounted position on the long haul carrier with its longitudinal axis aligned with the longitudinal axis of the long haul carrier, said long haul carrier comprising a railway car having a substantially flat top with guide means thereon for engaging and turning a container unit into its axes aligned position on the top of the car, said guide means comprising a straight guide slot and a second guide slot divergent away from the straight slot on said railway car top receiving spaced guide pins depending from the container unit; and switching means at the junction of said slots for switching the guide pins into different guide slots, movement of a first guide pin of the container unit into the divergent slot causing operation of the switching means to switch the subsequent guide pin on the container unit into the straight slot.

(References on following page)

References Cited by the Examiner

UNITED STATES PATENTS

| | | | |
|---|---|---|---|
| 1,425,965 | 8/22 | Hocke | 214—515 |
| 1,835,133 | 12/31 | Bergen | 214—38.20 X |
| 2,132,612 | 10/38 | Faries | 214—516 |
| 2,812,873 | 11/57 | Coleman | 214—515 |
| 2,873,502 | 2/59 | Hodges et al. | 214—516 |
| 2,897,769 | 8/59 | Bishop et al. | 104—88 |
| 2,959,303 | 11/60 | Wheltle | 214—38.10 |
| 3,002,760 | 10/61 | Lee | 214—515 X |
| 3,102,646 | 9/63 | Clejan | 214—38.10 X |
| 3,112,040 | 11/63 | Levitt et al. | 214—38.10 |

FOREIGN PATENTS 158,668  2/21  Great Britain.

HUGO O. SCHULZ, *Primary Examiner.*

GERALD M. FORLENZA, *Examiner.*